United States Patent
Shibui et al.

(10) Patent No.: US 8,294,319 B2
(45) Date of Patent: Oct. 23, 2012

(54) MOTOR ROTOR AND METHOD FOR CORRECTING ROTATING BALANCE THEREOF

(75) Inventors: Yasuyuki Shibui, Tokyo (JP); Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 429 days.

(21) Appl. No.: 12/303,076

(22) PCT Filed: Apr. 25, 2007

(86) PCT No.: PCT/JP2007/058949
§ 371 (c)(1),
(2), (4) Date: Dec. 1, 2008

(87) PCT Pub. No.: WO2007/145033
PCT Pub. Date: Dec. 21, 2007

(65) Prior Publication Data
US 2009/0139079 A1 Jun. 4, 2009

(30) Foreign Application Priority Data
Jun. 16, 2006 (JP) .................................. 2006-167348

(51) Int. Cl.
*H02K 15/03* (2006.01)
*H02K 1/28* (2006.01)
*H02K 1/27* (2006.01)

(52) U.S. Cl. ............ 310/156.28; 310/156.31; 310/271; 29/598

(58) Field of Classification Search ............. 310/156.28, 310/262, 156.12, 156.22, 156.23, 156.31, 310/271; *H02K 1/27, 1/28, 1/30, 15/03*
See application file for complete search history.

(56) References Cited

U.S. PATENT DOCUMENTS

| | | | | |
|---|---|---|---|---|
| 2,519,895 A | * | 8/1950 | Edwards et al. | 310/156.79 |
| 2,522,233 A | * | 9/1950 | Merrill | 310/156.77 |
| 4,028,909 A | | 6/1977 | Jancic et al. | |
| 4,433,261 A | | 2/1984 | Nashiki et al. | |
| 4,497,670 A | | 2/1985 | Siga et al. | |

(Continued)

FOREIGN PATENT DOCUMENTS

JP 43-35302 5/1973

(Continued)

OTHER PUBLICATIONS

International Search Report issued in related application No. PCT/JP2007/058595, completed Jul. 12, 2007 and mailed Jul. 24, 2007.

(Continued)

*Primary Examiner* — Quyen Leung
*Assistant Examiner* — Michael Andrews
(74) *Attorney, Agent, or Firm* — Griffin & Szipl, P.C.

(57) ABSTRACT

The invention is characterized in that in a motor rotor constituted by a motor shaft (30), a permanent magnet (31) surrounding the motor shaft (30) around an axis, a pair of end rings (32, 32) surrounding the motor shaft (30) around the axis and pinching the permanent magnet (31) from both sides in an axial direction, and a hollow cylindrical outer sleeve (33) surrounding the permanent magnet (31) and a pair of end rings (32, 32) in a fastening state around the axis, one end portion or both end portions of the outer sleeve (33) protrudes in the axial direction than an end surface of the end ring (32). A rotating balance correction is executed by pruning away a part of the protruding portion.

18 Claims, 3 Drawing Sheets

U.S. PATENT DOCUMENTS

| | | | |
|---|---|---|---|
| 4,543,506 A | | 9/1985 | Kawada et al. |
| 4,617,726 A | * | 10/1986 | Denk .............................. 29/598 |
| 4,625,135 A | * | 11/1986 | Kasabian ................... 310/156.28 |
| 4,631,435 A | * | 12/1986 | McCarty ................... 310/156.77 |
| 4,742,259 A | * | 5/1988 | Schaefer et al. .......... 310/156.28 |
| 4,910,861 A | | 3/1990 | Dohogne |
| 4,918,802 A | | 4/1990 | Schaefer |
| 4,933,583 A | | 6/1990 | Ripplinger |
| 4,973,872 A | | 11/1990 | Dohogne |
| 5,111,094 A | | 5/1992 | Patel et al. |
| 5,202,596 A | | 4/1993 | Jensen et al. |
| 5,237,737 A | * | 8/1993 | Zigler et al. .............. 310/156.28 |
| 5,563,463 A | * | 10/1996 | Stark ........................ 310/156.28 |
| 5,739,615 A | | 4/1998 | McClelland |
| 5,801,470 A | * | 9/1998 | Johnson et al. ........... 310/156.28 |
| 6,085,527 A | | 7/2000 | Woollenweber et al. |
| 6,661,132 B2 | | 12/2003 | Kobayashi |
| 6,836,954 B1 | * | 1/2005 | Carli et al. ................ 310/156.29 |
| 7,228,615 B2 | | 6/2007 | Nilson |
| 7,365,465 B2 | | 4/2008 | Ludwig |
| 7,812,495 B2 | * | 10/2010 | Shiao et al. .............. 310/156.28 |
| 7,834,504 B2 | | 11/2010 | Shibui et al. |
| 2003/0062787 A1 | | 4/2003 | Kobayashi |

FOREIGN PATENT DOCUMENTS

| | | | |
|---|---|---|---|
| JP | | 63-133855 | 6/1988 |
| JP | | 02-231945 | 9/1990 |
| JP | | 05-316671 | 11/1993 |
| JP | 2000023399 | A | 1/2000 |
| JP | 2000-184639 | A | 6/2000 |
| JP | | 2000-278898 | 10/2000 |
| JP | | 2003-180058 | 6/2003 |
| JP | 2003-180058 | A | 6/2003 |
| JP | | 2006-141164 | 6/2006 |

OTHER PUBLICATIONS

International Search Report issued in corresponding application No. PCT/JP2007/058949, completed May 24, 2007 and mailed Jun. 5, 2007.

Office Action issued in co-pending U.S. Appl. No. 12/303,070, mailed Apr. 27, 2010.

Office Action issued in corresponding Korean Application No. 10-2008-7030541, mailed Jun. 21, 2010.

Office Action issued in corresponding Korean Patent Application No. 10-2008-7030542, completed Aug. 31, 2010.

Office Action issued in corresponding Chinese Patent Application No. 200780022505.6, mailed Sep. 9, 2010.

McGraw-Hill Dictionary of Scientific and Technical Terms 1454 (1978).

Shrink Fit, at http://encyclopedia2.thefreedictionary.com/p/shrink fit (2012), downloaded May 15, 2012.

Shrink Fit, at http://www.thefreedictionary.com/p/shrink fit (2012), downloaded May 15, 2012.

USPTO Patent Full-Text and Image Database, search results for ACLM/shrink-fit, dated May 14, 2012, six pages (filed concurrently herewith as Exhibit A).

* cited by examiner

MOTOR ROTOR AND METHOD FOR CORRECTING ROTATING BALANCE THEREOF

This is a National Phase Application in the United States of International Patent Application No. PCT/JP2007/058949 filed Apr. 25, 2007, which claims priority on Japanese Patent Application No. 167348/2006, filed Jun. 16, 2006. The entire disclosures of the above patent applications are hereby incorporated by reference.

BACKGROUND OF THE INVENTION

1. Field of the Invention

The present invention relates to a motor rotor in which a rotating balance can be corrected with a good operability, and a method for correcting the rotating balance, and more particularly to a motor rotor which is preferably mounted to a motor-driven supercharger, and a method for correcting a rotating balance thereof.

2. Description of the Related Art

In order to improve an internal combustion engine, there has been widely used a supercharger (called also as "turbocharger") driven by an exhaust gas of an internal combustion engine so as to compress an intake air and supercharge. Further, there is employed a supercharger in which an acceleration response or the like is improved by embedding an electric motor coaxially with a rotating shaft of the supercharger and accelerating and assisting a rotational drive of a compressor. The supercharger having a motor-driven assist function by the electric motor is called as a motor-driven supercharger.

A description will be given briefly of a structure of this kind of motor-driven supercharger. A supercharger rotor structured such that a turbine impeller and a compressor impeller are coupled to both ends of a rotating shaft is rotatably supported within a housing. The housing has an electric motor built-in. A rotor (a motor rotor) of the electric motor is fixed coaxially with the rotating shaft, and a stator (a motor stator) of the electric motor is arranged around the rotor in an inner portion of the housing. If an exhaust gas from the internal combustion engine is supplied to a turbine impeller, the turbine impeller is rotationally driven, and a compressor impeller coupled to the turbine impeller is rotationally driven, thereby compressing an intake air so as to supply to the internal combustion engine. Further, at this time, a rotational drive of the compressor impeller is assisted by the electric motor.

The motor rotor of the motor-driven supercharger mentioned above is disclosed in the following patent document 1. FIG. 1 is a cross sectional view showing a conventional motor rotor disclosed in patent document 1. The motor rotor is constituted by an inner sleeve 51 inserted and attached to a turbine shaft 50 of a supercharger, a permanent magnet 52 surrounding the inner sleeve 51 around an axis, and a hollow cylindrical outer sleeve 53 surrounding the permanent magnet 52 around the axis. The outer sleeve 53 is shrink fitted in such a manner as to be capable of sufficiently holding the permanent magnet 52 even under a condition that a great centrifugal force is applied at a maximum rotating speed of the rotor.

In a manufacturing step of the motor-driven supercharger, a rotating balance is corrected by executing a rotating balance test after assembling the motor rotor. In the case of the conventional motor rotor shown in FIG. 1, the balance correction is executed by pruning away a part (a portion shown by reference symbol A in the drawing) of an end surface of the permanent magnet 52. However, if the permanent magnet 52 is pruned away, a magnetic force of the permanent magnet 52 is changed. Since a rotating balance correcting amount has an individual difference, a magnetic force of the permanent magnet 52 is dispersed per products. Further, since a crack is generated by pruning away the permanent magnet 52, or a stress generated at a time when a force is applied to the permanent magnetic 52 becomes non-uniform in comparison with the case that the permanent magnet 52 is not pruned away, a strength is lowered.

In order to cope with the problem mentioned above, the conventional additional motor rotor as shown in FIG. 2 has been proposed. The motor rotor is constituted by an inner sleeve 51 inserted and attached to the turbine shaft 50, the permanent magnet 52 surrounding the inner sleeve 51 around an axis, a pair of end rings 54 and 54 pinching the permanent magnet 52 from both sides in an axial direction, and a hollow cylindrical outer sleeve 53 surrounding the permanent magnet 52 and a pair of end rings 54 and 54 around the axis. The outer sleeve 53 is shrink fitted to the permanent magnet 52 and the end rings 54 and 54.

As shown in FIG. 2, the end ring 54 and the outer sleeve 53 are flush in end surfaces. This is because no compression load with respect to the end ring 54 is applied to a protruding portion of the outer sleeve 53 from the end ring 54 and the protruding portion is not necessary functionally.

In the motor rotor having the structure mentioned above, the rotating balance correction is executed by pruning away a part (a portion shown by reference symbol B in the drawing) of the end ring 54. In this case, since it is not necessary to prune away the permanent magnet 52, there is not generated a problem that a magnetic force change or a strength reduction is generated.

Patent Document 1: The U.S. Pat. No. 6,085,527 (FIG. 5)

However, for example, in the motor-driven supercharger for a vehicle, since the motor rotor itself is a comparatively compact part, and the inner sleeve 51 protrudes in an axial direction from the end ring 54 as shown in FIG. 2, the inner sleeve 51 forms an obstacle and it is hard to prune away the end ring 54. In other words, an operability of the rotating balance correction is deteriorated.

As opposed to this problem, there is considered a method of pruning away the end portion in the axial direction of the outer sleeve 53, however, the end portion in the axial direction corresponds to a portion applying the compression load to the end ring 54, so that if this portion is pruned away, a fastening force with respect to the end ring 54 is reduced. Further, if this portion is pruned away too much, there is a possibility that a problem such as the end ring 54 slips (idle runs) or the like is generated. Accordingly, in the structure in FIG. 2, the method of pruning away the end portion in the axial direction of the outer sleeve 53 is not expedient.

SUMMARY OF THE INVENTION

The present invention is made by taking the problem mentioned above into consideration, and an object of the present invention is to provide a motor rotor in which an operability of a rotating balance correction can be improve, and a method for correcting a rotating balance.

In order to achieve the object mentioned above, the motor rotor and the method for correcting the rotating balance in accordance with the present invention employ the following means.

In other words, in accordance with the present invention, there is provided a motor rotor comprising:

a motor shaft;

a permanent magnet surrounding the motor shaft around an axis;

a pair of end rings surrounding the motor shaft around the axis and pinching the permanent magnet from both sides in an axial direction; and a hollow cylindrical outer sleeve surrounding the permanent magnet and the pair of end rings in a fastening state around the axis, wherein one end portion or both end portions of the outer sleeve protrudes in the axial direction than an end surface of the end ring.

As mentioned above, since one end portion or both the end portions of the outer sleeve protrudes in the axial direction than the end surface of the end ring, it is possible to correct a rotating balance by pruning away the protruding portion. Since the protruding portion exists at a position which is away from the motor shaft, the motor shaft does not form an obstacle at a time of pruning away the outer sleeve. Accordingly, an operability of the rotating balance correction is improved.

Further, in accordance with the present invention, there is provided a motor rotor comprising:

a motor shaft;

a permanent magnet surrounding the motor shaft around an axis; and a hollow cylindrical outer sleeve surrounding the permanent magnet in a fastening state around the axis, wherein one end portion or both end portions of the outer sleeve protrudes in the axial direction than an end surface of the permanent magnet.

As mentioned above, since one end portion or both the end portions of the outer sleeve protrudes in the axial direction than the end surface of the permanent magnet, it is possible to correct a rotating balance by pruning away the protruding portion. Since the protruding portion exists at a position which is away from the motor shaft, the motor shaft does not form an obstacle at a time of pruning away the outer sleeve. Accordingly, an operability of the rotating balance correction is improved.

Further, in accordance with the present invention, there is provided a method for correcting a rotating balance of a motor rotor, the motor rotor having a motor shaft, a permanent magnet surrounding the motor shaft around a axis, a pair of end rings surrounding the motor shaft around the axis and pinching the permanent magnet from both sides in an axial direction, and a hollow cylindrical outer sleeve surrounding the permanent magnet and the pair of end rings in a fastening state around the axis, comprising:

structuring the outer sleeve such that one end portion or both end portions thereof protrudes in the axial direction than an end surface of the end ring; and correcting the rotating balance by pruning away a part of one end portion or both end portions of the outer sleeve.

Further, in accordance with the present invention, there is provided a method for correcting a rotating balance of a motor rotor, the motor rotor having a motor shaft, a permanent magnet surrounding the motor shaft around an axis, a hollow cylindrical outer sleeve surrounding the permanent magnet in a fastening state around the axis, comprising;

structuring the outer sleeve such that one end portion or both end portions thereof protrudes in the axial direction than an end surface of the permanent magnet; and correcting the rotating balance by pruning away a part of one end portion or both end portions of the outer sleeve.

As mentioned above, in accordance with the present invention, it is possible to obtain an excellent effect that an operability of the rotating balance correction can be improved.

DESCRIPTION OF THE PREFERRED EMBODIMENTS

Figure 1:
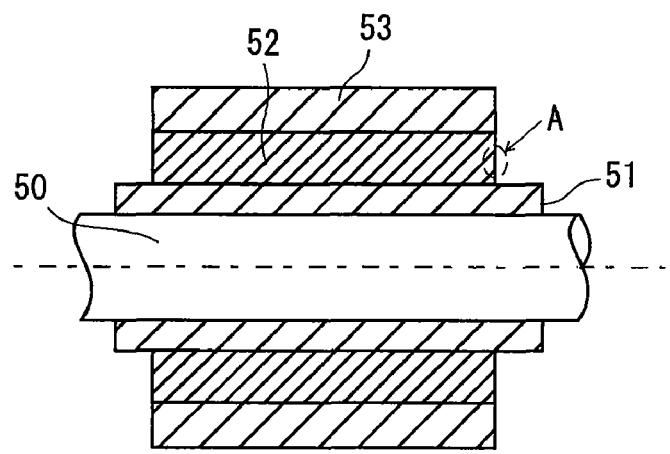
FIG. 1 is a view showing a structure of a conventional motor rotor.
Figure 2:
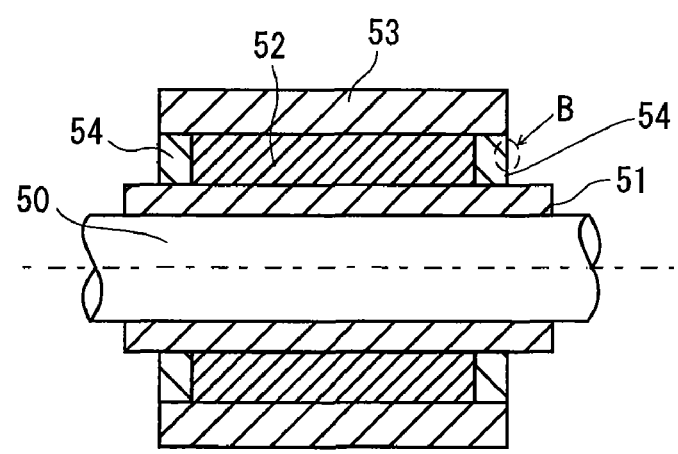
FIG. 2 is a view showing a structure of another conventional motor rotor.

A description will be in detail given below of preferable embodiments in accordance with the present invention on the basis of the accompanying drawings. In this case, the same reference numerals are attached to common portions in each of the drawings, and an overlapping explanation will be omitted.

Figure 3:
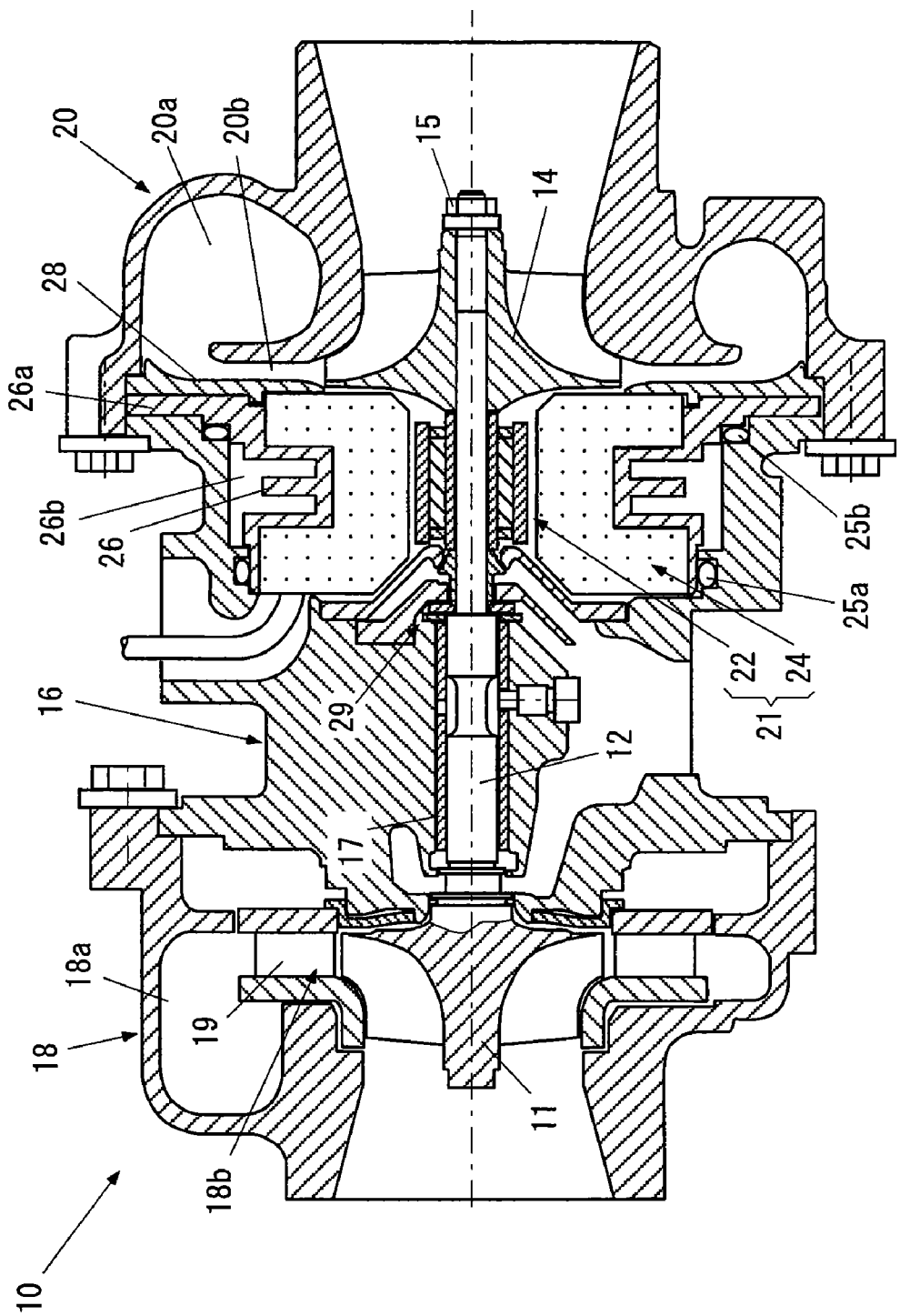
FIG. 3 is a view showing a structure of a motor-driven supercharger provided with an electric motor having a motor rotor in accordance with an embodiment of the present invention.

FIG. 3 is a view of a whole structure of a motor-driven supercharger provided with an electric motor having a motor rotor in accordance with an embodiment of the present invention. In this drawing, a motor-driven supercharger 10 is provided with a turbine shaft 12, a compressor impeller 14, an electric motor 21 and a housing. The housing is constituted by a bearing housing 16, a turbine housing 18 and a compressor housing 20 in this embodiment.

The turbine shaft 12 has a turbine impeller 11 in one end (a left end in the drawing). In this embodiment, the turbine impeller 11 is integrally formed in the turbine shaft 12, however, the present invention is not limited to this, but may be structured such that the turbine impeller 11 is independently attached.

The compressor impeller 14 is coupled to the other end (a right end in the drawing) of the turbine shaft 12 by an end nut 15 so as to be integrally rotated.

The bearing housing 16 has a radial bearing 17 receiving a radial load of the turbine shaft 12, and a thrust bearing 29 receiving a thrust load built-in, and the turbine shaft 12 is rotatably supported by the radial bearing 17 and the thrust bearing 29. Further, the bearing housing 16 has a lubricating oil flow path (not shown) for lubricating the radial bearing 17 and the thrust bearing 29.

The turbine housing 18 rotatably surrounds the turbine impeller 11, and is coupled to the bearing housing 16. The turbine housing 18 has a scroll chamber 18a in which an exhaust gas is introduced to an inner portion from an outer portion, and an annular formed flow path 18b guiding the exhaust gas from the scroll chamber 18a to the turbine impeller 11.

Further, a plurality of nozzle vanes 19 are arranged in the flow path 18b at a fixed interval in a peripheral direction. The nozzle vanes 19 are constituted by variable nozzle vanes, and are preferably structured such that the nozzle vanes 19 can change a flow path area formed therebetween. However, the present invention is not limited to this, but a fixed nozzle vane may be employed. Further, the present invention may be structured in an aspect that the nozzle vane 19 is not provided in the flow path 18b.

The compressor housing 20 rotatably surrounds the compressor impeller 14, and is coupled to the bearing housing 16.

The compressor housing 20 has a scroll chamber 20a in which a compressed air is introduced into an inner portion, an annular formed diffuser 20b guiding the compressed air from the compressor impeller 14 to the scroll chamber 20a.

An electric motor 21 has a motor rotor 22 and a motor stator 24. The motor rotor 22 corresponds to a rotor of an electric motor 21, and the motor stator 24 corresponds to a stator of the electric motor 21. A brushless AC motor is constructed by the motor rotor 22 and the motor stator 24.

It is preferable that the AC motor can correspond to a high-speed rotation (for example, at least 100 to 200 thousands rpm) of the turbine shaft 12, and can executed a rotational drive at a time of accelerating, and a regenerative drive at a time of decelerating. Further, it is preferable that a drive voltage of the AC motor is equal to or higher than a DC voltage of a battery mounted to a vehicle.

In the motor-driven supercharger 10 structured as mentioned above, if the exhaust gas is introduced from an engine to the scroll chamber 18a, the turbine impeller 11 is rotationally driven by the exhaust gas. Accordingly, the compressor impeller 14 coupled to the turbine impeller 11 via the turbine shaft 12 is rotationally driven, and the intake air is compressed by the compressor impeller 14 so as to be supplied to the engine. Further, at this time, the rotational drive of the compressor impeller 14 is assisted by the electric motor 21.

The motor-driven supercharger 10 is provided with a flow path forming sleeve 26 and a seal plate 28. The flow path forming sleeve 26 is closely attached to an outer peripheral surface of the motor stator 24 and an inner peripheral surface of the bearing housing 16, and constructs a water cooling jacket 26b with respect to the bearing housing 16. A cooling water is supplied to the water cooling jacket 26 from a cooling water supply port (not shown), and a cooling water is discharged from a cooling water discharge port (not shown). A seal member 25a and 25b (for example, an O-ring) sealing inner and outer sides of the water cooling jacket 26b in a liquid tight manner is interposed between the bearing housing 16 and the flow path forming sleeve 26.

The seal plate 28 is fastened in an axial direction between the bearing housing 16 and the compressor housing 20 together with the flange portion 26a of the flow path forming sleeve 26. The seal plate 28 comparts between the compressor housing 20 and the motor stator 24, and is closely attached to the compressor side of the flow path forming sleeve 26.

Figure 4:
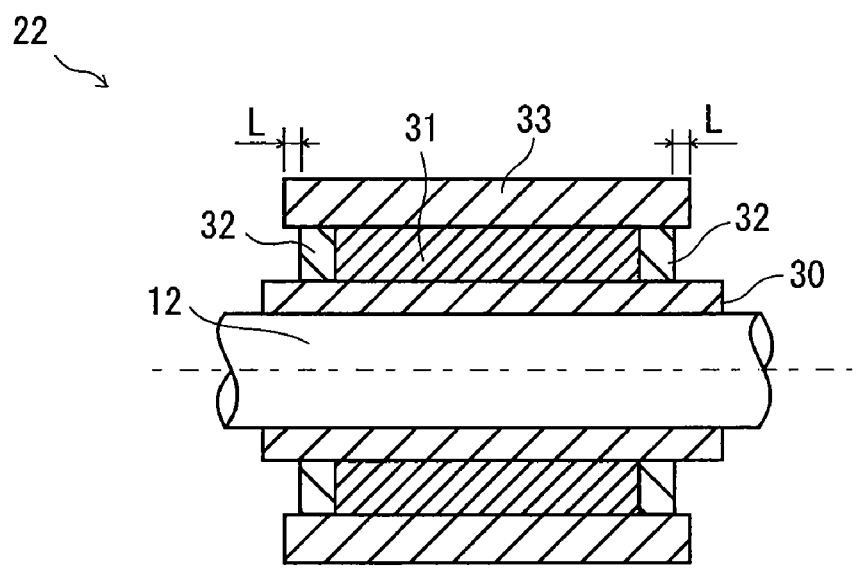
FIG. 4 is a view showing a structure of a motor rotor in accordance with an embodiment of the present invention.

FIG. 4 is an enlarged view of the motor rotor 22 shown in FIG. 3. As shown in FIG. 4, the motor rotor 22 in accordance with the present embodiment is constituted by a motor shaft (an inner sleeve) 30, a permanent magnet surrounding the motor shaft 30 around an axis, a pair of end rings 32 and 32 pinching the permanent magnet 31 from both sides in the axial direction as well as surrounding the motor shaft 30 around the axis, and a hollow cylindrical outer sleeve 33 surrounding the permanent magnet 31 and a pair of end rings 32 and 32 around the axis in a fastening state.

In the present embodiment, the motor shaft 30 corresponds to a hollow cylindrical inner sleeve inserted and attached to the turbine shaft 12, and the hollow cylindrical permanent magnet 31 and the end ring 32 are fitted to an outer periphery of the motor shaft 30 in accordance with a weak close fitting. The motor shaft 30 is pinched by the other member from both sides in an axial direction thereof so as to be rotated integrally with the turbine shaft 12.

In this case, the motor shaft 30 may be constituted by the other rotating shaft coupled coaxially with the turbine shaft 12, and in this case, the motor shaft 30 may not be formed in a hollow cylindrical shape.

The outer sleeve 33 and the end ring 32 are made of a non-magnetic material. The outer sleeve 33 is fitted to the permanent magnet 31 and the end ring 32 in accordance with such a strong shrink fitting as to apply a sufficient compression load to the permanent magnet 31 and the end rings 32, in such a manner as to prevent the permanent magnet 31 and the end ring 32 from idle running even under a condition that a great centrifugal force is applied at a maximum rotating speed of the motor rotor 22.

As shown in FIG. 4, both end portions of the outer sleeve 33 protrude in the axial direction from the end surface of the end ring 32. In the present embodiment, both end portions of the outer sleeve 33 protrude in the axial direction than the end surface of the end ring 32, however, the structure may be made such that only one end portion protrudes in the axial direction.

As mentioned above, since one end portion or both end portions of the outer sleeve 33 protrudes in the axial direction from the end surface of the end ring 32, it is possible to correct a rotating balance by pruning away a part of the protruding portion. The rotating balance correction of the motor rotor 22 is generally executed by assembling the motor rotor 22, thereafter rotating a single substance of the motor rotor 22 at a high speed, measuring the data necessary for correcting the balance, and cutting a part of the end portion of the outer sleeve 33 on the basis of the measured data. In this case, there is a case that the rotating balance correction is executed in a state in which the motor rotor 22 and the other parts (a turbine shaft or the like) are combined.

In accordance with the present embodiment mentioned above, since the end portion of the outer sleeve 33 pruned away at a time of correcting the rotating balance exists at a position which is away from the motor shaft 30 (the inner sleeve), the motor shaft 30 does not form an obstacle at a time of pruning away the outer sleeve 33. Accordingly, an operability of the rotating balance correction is improved.

It is preferable to set a length L at which both end portions of the outer sleeve 33 protrude from the end surface of the end ring 32, to such a necessary and sufficient length as to suppress an increase of an inertia moment as much as possible while securing such a correcting margin as to execute the rotating balance correction.

Further, since the protruding portion in the axial direction than the end ring 32 is pruned away in the outer sleeve 33, the compression load applied to the end ring 32 is not reduced even by pruning away this portion. Accordingly, there is not generated a problem that the end ring 32 slips (idle runs) at a time of rotating at a high speed due to the too much pruning away.

Further, in the case that the structure is made, as in the present embodiment, such that both end portions of the outer sleeve 33 protrude in the axial direction than the end surface of the end ring 32, it is possible to execute the rotating balance correction by pruning away a part in both end portions. Accordingly, a precision of the balance correction is improved. In this case, in the case that a volumetric capacity of the motor rotor 22 itself is small, and a sufficient rotating balance correction can be executed only by pruning away one end portion of the outer sleeve 33, the structure may be made such that only one end portion protrudes in the axial direction than the end surface of the end ring 32. In the case of this structure, it is possible to reduce the inertia moment of the protruding portion from the end ring 32, in comparison with the case that both end portions protrude.

Further, in the present embodiment, since the permanent magnet 31 is pinched by the pair of end rings 32, the permanent magnet 31 is not directly exposed to a circumferential ambient atmosphere of the motor rotor 22. Accordingly, it is possible to protect the permanent magnet 31 and it is possible to suppress a rust generation.

Figure 5:
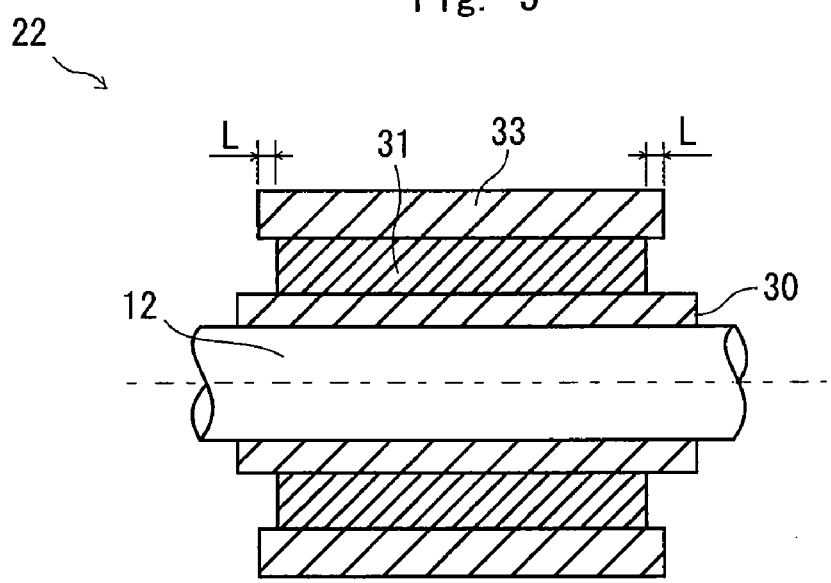
FIG. 5 is a view showing a structure of a motor rotor in accordance with another embodiment of the present invention.

FIG. 5 is a cross sectional view showing a structure of a motor rotor 22 in accordance with another embodiment of the present invention. The motor rotor 22 is constituted by a motor shaft 30, a permanent magnet 31 surrounding the motor shaft 30 around an axis, and a hollow cylindrical outer sleeve 33 surrounding the permanent magnet 31 around the axis in a fastening state.

In the present embodiment, the motor shaft 30 corresponds to a hollow cylindrical inner sleeve inserted and attached to the turbine shaft 12, and the hollow cylindrical permanent magnet 31 is fitted to an outer periphery of the motor shaft 30 in accordance with a weak close fitting. The motor shaft 30 is pinched by the other member from both sides in an axial direction thereof so as to be rotated integrally with the turbine shaft 12.

In this case, the motor shaft 30 may be constituted by the other rotating shaft coupled coaxially with the turbine shaft, and in this case, the motor shaft 30 may not be formed in a hollow cylindrical shape.

The outer sleeve 33 is fitted to the permanent magnet 31 in accordance with such a strong shrink fitting as to apply a sufficient compression load to the permanent magnet 31, in such a manner as to prevent the permanent magnet 31 from idle running even under a condition that a great centrifugal force is applied at a maximum rotating speed of the motor rotor 22.

As shown in FIG. 5, both end portions of the outer sleeve 33 protrude in the axial direction from the end surface of the permanent magnet 31. In the present embodiment, both end portions of the outer sleeve 33 protrude in the axial direction than the end surface of the permanent magnet 31, however, the structure may be made such that only one end portion protrudes in the axial direction.

As mentioned above, since one end portion or both end portions of the outer sleeve 33 protrudes in the axial direction from the end surface of the permanent magnet 31, it is possible to correct a rotating balance by pruning away a part of the protruding portion. The protruding portion exists at a position which is away from the motor shaft 30 (the inner sleeve), the motor shaft 30 does not form an obstacle at a time of pruning away the outer sleeve 33. Accordingly, an operability of the rotating balance correction is improved.

It is preferable to set a length at which both end portions of the outer sleeve 33 protrude from the end surface of the permanent magnet 31, to such a necessary and sufficient length as to suppress an increase of an inertia moment as much as possible while securing such a correcting margin as to execute the rotating balance correction.

Further, since the outer sleeve 33 is pruned away at a time of correcting the rotating balance in spite of the provision of no end ring 32 shown in FIG. 4, the permanent magnet 31 is not pruned away. Accordingly, there is not generated a problem that a magnetic force change and a strength reduction are generated.

Further, in the case that the structure is made, as in the present embodiment, such that both end portions of the outer sleeve 33 protrude in the axial direction than the end surface of the permanent magnet 31, it is possible to execute the rotating balance correction by pruning away a part in both end portions. Accordingly, a precision of the balance correction is improved. In this case, in the case that a volumetric capacity of the motor rotor 22 itself is small, and a sufficient rotating balance correction can be executed only by pruning away one end portion of the outer sleeve 33, the structure may be made such that only one end portion protrudes in the axial direction than the end surface of the permanent magnet 31. In the case of this structure, it is possible to reduce the inertia moment of the protruding portion from the permanent magnet 31, in comparison with the case that both end portions protrude.

In this case, in the structure mentioned above, the description is given of the embodiments in accordance with the present invention, however, the embodiments in accordance with the present invention disclosed in the above description is given only for exemplification, and the scope of the present invention is not limited to the embodiments of the present invention. In the embodiments mentioned above, the description is given of the example in which the present invention is applied to the motor rotor of the electric motor of the motor-driven supercharger, however, the present invention is not limited to them, but can be applied to a motor rotor of an electric motor used for the other devices in the same manner.

The scope of the present invention is indicated by the description of claims, and includes all the modifications within the scope equivalent to the description of claims.

What is claimed is:

1. A motor rotor comprising:
   (a) a hollow cylindrical motor shaft;
   (b) a hollow cylindrical permanent magnet surrounding the motor shaft around an axis;
   (c) a pair of end rings surrounding the motor shaft around the axis and pinching the permanent magnet from both sides in an axial direction; and
   (d) a hollow cylindrical outer sleeve surrounding the permanent magnet and the pair of end rings in a fastening state around the axis, wherein the hollow cylindrical outer sleeve surrounding the permanent magnet and the pair of end rings in the fastening state around the axis is fitted to the permanent magnet and the pair of end rings by a shrink fit so the hollow cylindrical outer sleeve applies a compression load to the permanent magnet and to the pair of end rings that is sufficient to prevent idle running of the permanent magnet and the pair of end rings when the motor rotor is rotating at a maximum rotating speed, and
   wherein the hollow cylindrical outer sleeve comprises two end portions, wherein one end portion or both of the two end portions have been pruned sufficiently to correct a rotating balance of the motor rotor, wherein one end portion or both of the two end portions of the outer sleeve protrudes further in the axial direction than an end surface of one or both of the end rings.

2. A motor rotor as recited by claim 1, wherein the hollow cylindrical outer sleeve and the pair of end rings are made of a non-magnetic material.

3. A motor rotor as recited by claim 1, wherein the hollow cylindrical motor shaft consists of a single hollow cylindrical shaft, and wherein the hollow cylindrical permanent magnet consists of a single hollow cylindrical magnet.

4. A motor rotor as recited by claim 1, wherein the hollow cylindrical motor shaft comprises a hollow cylindrical inner sleeve in which a turbine shaft is inserted so the hollow cylindrical inner sleeve is attached to the turbine shaft so as to rotate integrally with the turbine shaft.

5. A motor rotor comprising:
   (a) a hollow cylindrical motor shaft;
   (b) a hollow cylindrical permanent magnet surrounding the motor shaft around an axis; and
   (c) a hollow cylindrical outer sleeve surrounding the permanent magnet in a fastening state around the axis, wherein the hollow cylindrical outer sleeve surrounding the permanent magnet in the fastening state around the axis is fitted to the permanent magnet by a shrink fit so the hollow cylindrical outer sleeve applies a compression load to the permanent magnet that is sufficient to prevent idle running of the permanent magnet when the motor rotor is rotating at a maximum rotating speed, and wherein the hollow cylindrical outer sleeve comprises two end portions, wherein one end portion or both of the two end portions have been pruned sufficiently to correct a rotating balance of the motor rotor, wherein one end portion or both of the two end portions of the outer sleeve protrudes further in the axial direction than an end surface of the permanent magnet.

6. A motor rotor as recited by claim 5, wherein the hollow cylindrical outer sleeve is made of a non-magnetic material.

7. A motor rotor as recited by claim 5, wherein the hollow cylindrical motor shaft consists of a single hollow cylindrical shaft, and wherein the hollow cylindrical permanent magnet consists of a single hollow cylindrical magnet.

8. A motor rotor as recited by claim 5, wherein the hollow cylindrical motor shaft comprises a hollow cylindrical inner sleeve in which a turbine shaft is inserted so the hollow cylindrical inner sleeve is attached to the turbine shaft so as to rotate integrally with the turbine shaft.

9. A method for correcting a rotating balance of a motor rotor, wherein the motor rotor has a hollow cylindrical motor shaft, a hollow cylindrical permanent magnet surrounding the motor shaft around an axis, a pair of end rings surrounding the motor shaft around the axis and pinching the permanent magnet from both sides in an axial direction, and a hollow cylindrical outer sleeve surrounding the permanent magnet and the pair of end rings in a fastening state around the axis, wherein the method comprises the steps of:
  (a) structuring the outer sleeve so that one end portion or both end portions thereof protrudes further in the axial direction than an end surface of the pair of end rings; and
  (b) correcting the rotating balance by pruning away a part of one end portion or both end portions of the outer sleeve; and
  (c) shrink fitting the hollow cylindrical outer sleeve that surrounds the permanent magnet and the pair of end rings in the fastening state around the axis so that the hollow cylindrical outer sleeve and the pair end rings are fitted to the permanent magnet, wherein the hollow cylindrical outer sleeve applies a compression load to the permanent magnet and the pair of end rings sufficient to prevent idle running of the permanent magnet and the pair of end rings when the motor rotor is rotating at a maximum rotating speed.

10. A method as recited by claim 9, wherein the hollow cylindrical outer sleeve and the pair of end rings are made of a non-magnetic material.

11. A method as recited by claim 9, wherein the hollow cylindrical motor shaft consists of a single hollow cylindrical shaft, and wherein the hollow cylindrical permanent magnet consists of a single hollow cylindrical magnet.

12. A method as recited by claim 9, wherein the hollow cylindrical motor shaft comprises a hollow cylindrical inner sleeve in which a turbine shaft is inserted so the hollow cylindrical inner sleeve is attached to the turbine shaft so as to rotate integrally with the turbine shaft.

13. A method as recited by claim 9, wherein one end portion or both end portions of the outer sleeve protrudes further in the axial direction than the end surface of the pair of end rings following pruning of the one end portion or of both end portions.

14. A method for correcting a rotating balance of a motor rotor, wherein the motor rotor has a hollow cylindrical motor shaft, a hollow cylindrical permanent magnet surrounding the motor shaft around an axis, and a hollow cylindrical outer sleeve surrounding the permanent magnet in a fastening state around the axis, wherein the method comprises the steps of:
  (a) structuring the outer sleeve so that one end portion or both end portions thereof protrudes further in the axial direction than an end surface of the permanent magnet;
  (b) correcting the rotating balance by pruning away a part of one end portion or both end portions of the outer sleeve; and
  (c) shrink fitting the hollow cylindrical outer sleeve that surrounds the permanent magnet in the fastening state around the axis so that the hollow cylindrical outer sleeve is fitted to the permanent magnet, wherein the hollow cylindrical outer sleeve applies a compression load to the permanent magnet sufficient to prevent idle running of the permanent magnet when the motor rotor is rotating at a maximum rotating speed.

15. A method as recited by claim 14, wherein the hollow cylindrical outer sleeve is made of a non-magnetic material.

16. A method as recited by claim 14, wherein the hollow cylindrical motor shaft consists of a single hollow cylindrical shaft, and wherein the hollow cylindrical permanent magnet consists of a single hollow cylindrical magnet.

17. A method as recited by claim 14, wherein the hollow cylindrical motor shaft comprises a hollow cylindrical inner sleeve in which a turbine shaft is inserted so the hollow cylindrical inner sleeve is attached to the turbine shaft so as to rotate integrally with the turbine shaft.

18. A method as recited by claim 14, wherein one end portion or both end portions of the outer sleeve protrudes further in the axial direction than an end surface of the permanent magnet following pruning of the one end portion or of both end portions.

* * * * *